March 29, 1960    F. J. KENNEDY    2,930,269
FLYING SAW WITH STATIONARY MOTOR BASE
Filed Sept. 20, 1952    3 Sheets-Sheet 1
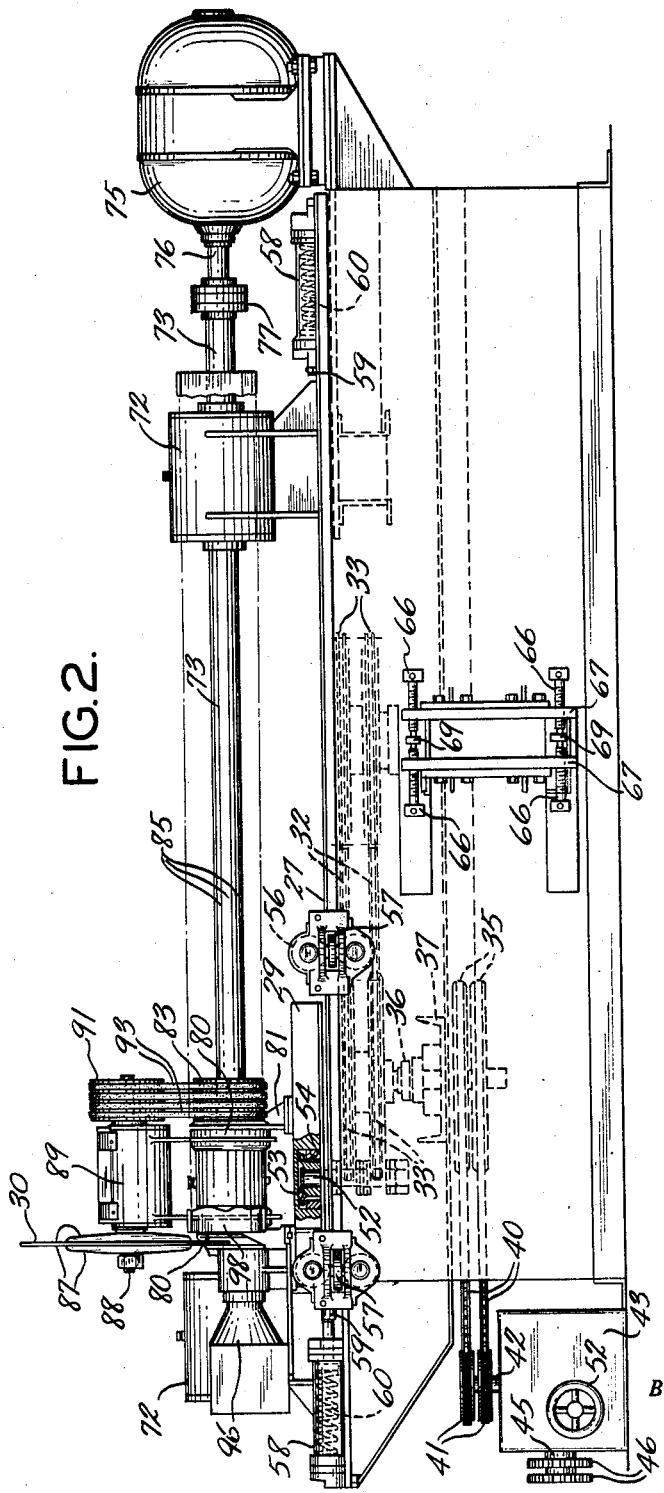
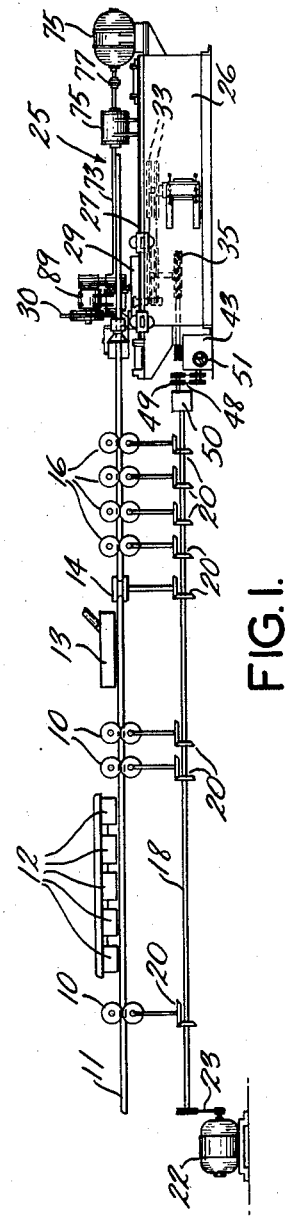
INVENTOR.
Frank J. Kennedy
BY Emery Varney
Whittemore & Dix
ATTORNEYS

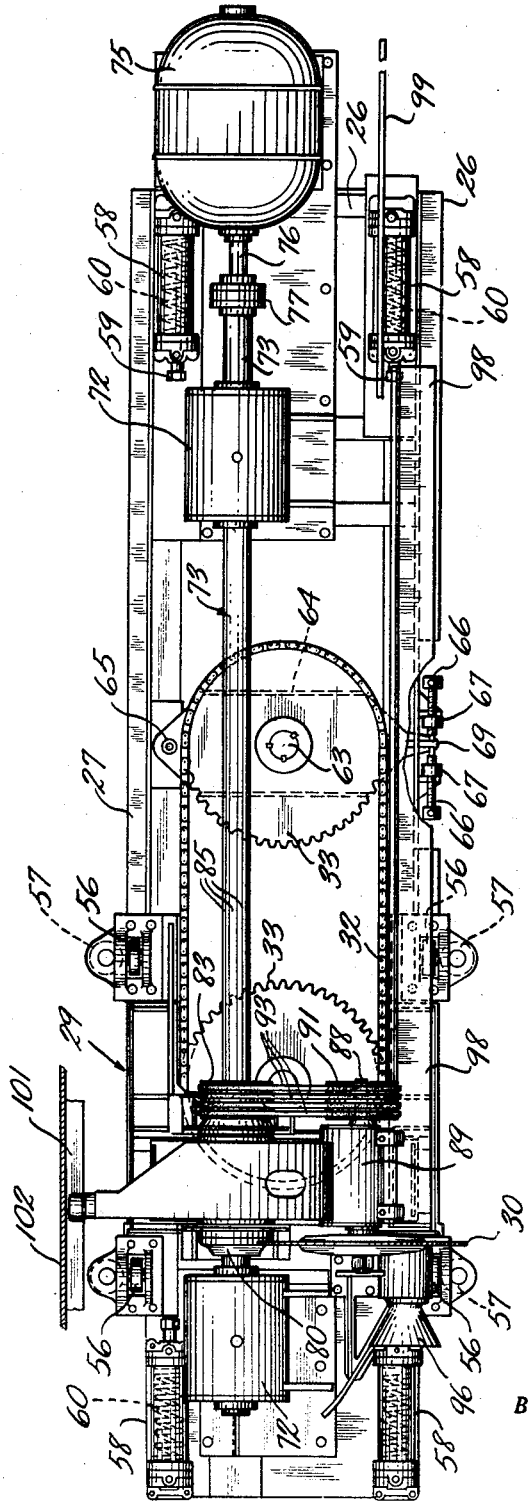

March 29, 1960 F. J. KENNEDY 2,930,269
FLYING SAW WITH STATIONARY MOTOR BASE
Filed Sept. 20, 1952 3 Sheets-Sheet 3
FIG. 4.
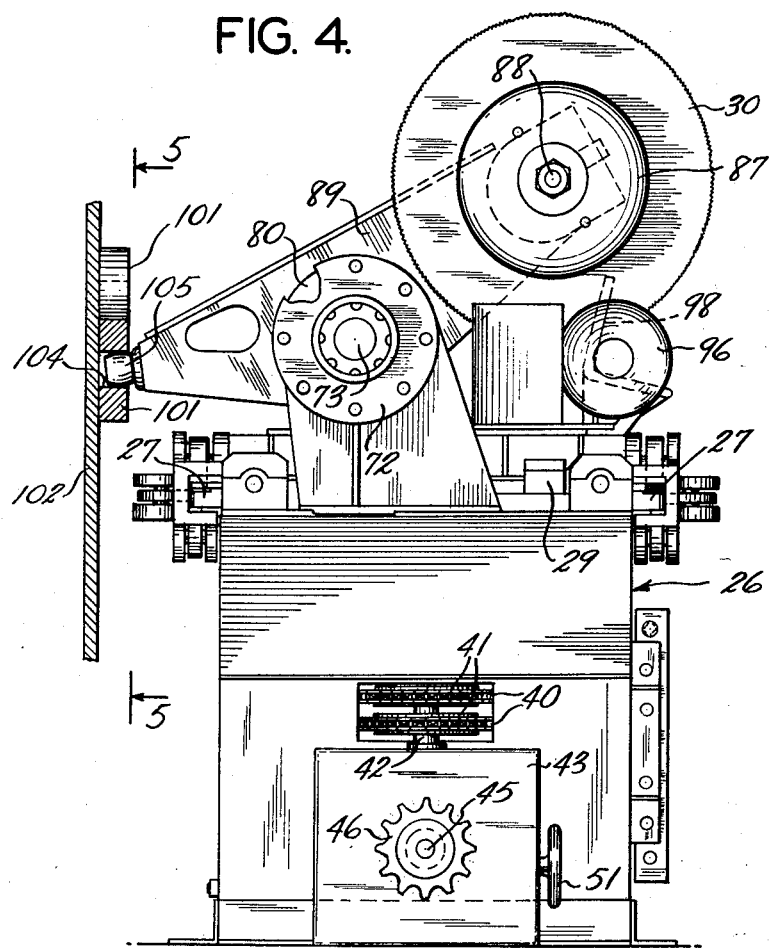
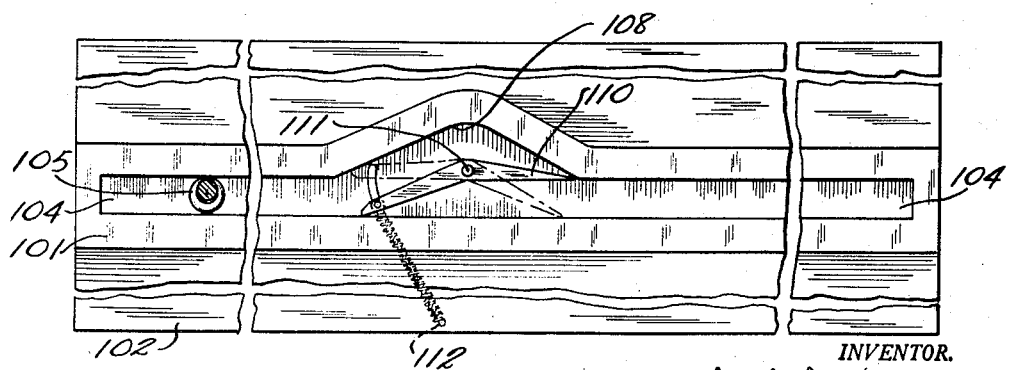
FIG. 5.
INVENTOR.
Frank J. Kennedy
BY
ATTORNEYS 2,930,269
Patented Mar. 29, 1960

2,930,269

FLYING SAW WITH STATIONARY MOTOR BASE

Frank J. Kennedy, Mount Lebanon, Pa., assignor to National Electric Products Corporation, Pittsburgh, Pa., a corporation of Delaware Application September 20, 1952, Serial No. 310,632

4 Claims. (Cl. 83—311)

This invention relates to tube mills and particularly to a combination of power-driven roll stands of the mill with flying cut-off apparatus for obtaining uniform and reliable cutting of lengths from the continuous and endless tubing manufactured by the mill.

One object of the invention is to provide improved mechanism for driving a flying cut-off from a continuous tube mill. Features of the invention relate to the adjusting of the driving connections to compensate for changes in speed produced by the elongation of the endless tubing in the sizing roll passes at the discharge end of the mill. This elongation factor distorts the speed of the tubing in terms of the peripheral speeds of the rolls between which the tube travels.

Another object of the invention is to provide an improved cut-off for severing lengths from continuous tubing delivered by a mill. Since a flying cut-off is required to accelerate from rest to the speed of the tubing, and then stop and reverse, for every cut, a substantial saving in power and the necessary weight and strength of equipment can be made by reducing the inertia of the reciprocating parts. One feature of this invention is the location of the motor of cut-off apparatus on a stationary base, and the transmission of power to the flying cutter through mechanism that reduces the reciprocating parts to a minimum.

Another feature of the invention relates to operating mechanism for giving the carriage of the flying cut-off a substantially uniform velocity throughout a large percentage of its stroke. This makes possible the synchronizing of the tube speed and the rate of travel of the flying cut-off carriage during the entire cutting operation. It also eliminates the necessity for high accuracy in operating the cut-off at a precise position in its stroke.

Other objects, features and advantages of the invention will appear or be pointed out as the description proceeds.

In the drawing, forming a part hereof, in which like reference characters indicate corresponding parts in all the views:

Figure 1 is a diagrammatic side elevation showing a portion of a continuous tube mill combined with a flying cut-off in accordance with this invention, Figure 2 is a front elevation, on a greatly enlarged scale, of the flying cut-off apparatus shown in Figure 1, Figure 3 is a top plan view of the apparatus shown in Figure 2, Figure 4 is an enlarged end view of the flying cut-off apparatus shown in Figures 2 and 3.

Figure 5 is a front view of the cam mechanism for operating the flying cut-off apparatus, this view being taken along the line 5—5 of Figure 4.

The tube mill shown in Figure 1 includes a number of successive feed roll stands 10 which advance an endless length of tubing 11 with continuous motion and substantially uniform speed. The tubing 11 passes under heating means comprising moderate temperature gas burners 12, and then passes under a high intensity welding torch 13, such as an oxyacetylene torch, which fuses the edges to make a weld.

The edges of the tubing are brought together by welding rolls 14, and the welded tubing then passes through a number of successive sizing roll passes 16 in which the tubing is reduced to a predetermined size with some resulting elongation.

The feed rolls 10, the welding rolls 14 and the rolls of the sizing roll passes 16 are preferably driven from a common drive shaft 18 through suitable gearing connections 20. The shaft 18 is driven by an electric motor 22 through a driving belt 23. A flying cut-off apparatus 25 is located beyond the last sizing roll stand 16 and is preferably driven from the same motor 22 that drives the rolls of the tube mill.

The flying cut-off apparatus includes a stationary base 26 (Figure 2) with guide means comprising a track 27 along the top of the base. There is a carriage 29 which runs along the track 27 and this carriage supports a cutter comprising a saw 30.

The carriage 29 is connected with an endless driving element located within the base 26 below the level of the track 27. This driving element is essentially an endless belt or chain passing around wheels which turn on parallel, spaced axes. In the construction illustrated, the endless belt consists of two chains 32, and the wheels that reverse the run of the chains comprise sprockets 33.

The left hand sprockets 33 are secured to a shaft with other sprockets 35, and this shaft turns in bearings 36 supported from a fixed element 37 of the base. Power is supplied to the sprockets 35 through driving chains 40 from smaller sprockets 41 on an output shaft 42 of a variable speed transmission 43.

A power input shaft 45, of the transmission 43, has sprockets 46 driven by a chain 48 (Figure 1) from a sprocket 49 on the output shaft of a speed reducer 50. This speed reducer 50 is driven from the same shaft 18 that supplies power to the roll stands of the tube mill.

The transmission 43 is preferably of the infinitely variable ratio type, which is well known in the art, and it is adjusted, to change its speed ratio, by a manually operated wheel 51. Thus the carriage 29 is reciprocated in timed relation with the rotary speed of the mill rolls and by power supplied from a common motor. The adjustable speed ratio of the transmission 43 makes possible an adjusting of the timing of the carriage to compensate for slippage of the tubing in the stands of the sizing roll and to compensate for elongation of the tubing which takes place in the sizing roll stands 16. The carriage 29 is connected with the chains 32 by means of a stud 52 extending upward from the chains into a crosshead 53 located in a transverse guideway 54 of the carriage 29. The stud 52 is secured to two corresponding links of the chains 32.

As the stud 52 travels around the arcs of the sprockets 33, the crosshead 53 moves transversely along the guideway 54; and the carriage 29 always partakes of any component of movement of the stud 52 in a direction parallel to the track 27.

The carriage 29 has wheels 56, best shown in Figure 3, by which it is supported from the track 27. The carriage 29 is held against transverse displacement on the track 27 by side rolls 57 which run along the outer faces of the sides of the track 27.

There are bumpers 58 at both ends of the stroke of the carriage 29. These bumpers include abutments 59 in position to contact with the end face of the carriage, and there are springs 60 which yield to permit movement of the abutments 59 when the carriage strikes against them.

The right hand sprockets 33 are carried on a vertical shaft 63 which is connected to a support 64. This support is movable about an offset pivot 65 in order to adjust the tension of the chains 32. Movement of the support 64 on its pivot 65 is effected by adjusting screws 66 which thread through lugs 67 on the base of the apparatus. An extension 69 of the support 64 projects between the screws 66, and this extension is moved to the right or left to change the chain tension by turning one of the screws 66 in one direction and the other screw in the other direction.

There are two main bearings 72 fixed to the stationary base 26, and a drive shaft 73 is supported near its opposite ends by these bearings 72. Beyond the right-hand bearing 72, the shaft 73 extends toward an electric motor 75 which has a shaft 76 connected to the shaft 73 by a coupling 77.

The shaft 73 extends through a frame 80 connected by brackets 81 to the reciprocating carriage 29. At one side of the frame 80 there are a group of driving pulleys 83 through which the shaft 73 extends. The pulleys 83 reciprocate with the frame 80 along the length of the drive shaft 73, as the carriage 29 moves back and forth along its track. The pulleys 83 rotate as a unit with the shaft 73, however, because the shaft 73 has splines or keys 85 which fit complementary, longitudinally extending grooves in the hub portions of the pulleys 83.

The saw 30 is clamped by plates 87 on a shaft 88 which rotates in bearings carried by a supporting yoke 89. At the end of the shaft 88, remote from the saw 30, there is a group of pulleys 91 in line with the driving pulleys 83 and connected with the driving pulleys by V belts 93, or other motion-transmitting means.

The yoke 89 rocks on the frame 80 about an axis of rotation that is substantially coincident with the axes of rotation of the pulleys 83 and drive shaft 85. Thus, rocking of the yoke 89 on the frame 80 does not change the distance of the pulleys 91 from the pulleys 83, and the tension of the belts 93 is not affected by the rocking of the yoke.

The tubing which is to be cut by the invention is advanced through a funnel-shaped guide 96 connected at a fixed location to the stationary base 26. A short distance beyond the guide 96 there is an angle guide section 98 which is rigidly secured to the carriage and which extends for a substantial distance beyond the carriage. Beyond this angle guide section 98, there is a fixed guard plate 99, secured to the stationary base 26, for guiding the ends of any crooked tubes.

When the yoke 89 rocks in a direction to lower the saw 30, the saw crosses the path of the tubing just ahead of the angle guide section 98. This rocking movement of the saw causes it to cut the tubing, and the rocking movement is timed with the reciprocation of the carriage 29 so that the saw contacts with the tubing when the carriage is traveling at the same speed as the tubing.

One of the advantages of this invention is that the carriage reaches its maximum velocity when its connection to the chain 32 reaches the end of the arc of contact of the chain with the sprocket 33; and the carriage continues to move with uniform velocity until its connection with the chain reaches the arc of contact of the chain with the sprocket 33 at the other end of the stroke. When the sprocket speeds are properly correlated with the speed of delivery of the tubing from the mill, the carriage 29 travels at the speed of the tubing for a substantial part of its stroke and thus obtains a straight, right-angular cut across the tubing. With flying saws that are operated by eccentrics or cranks, the speed of translation of the saw is synchronized with the speed of the tubing at only one point in its stroke, and cuts have to be made with extreme rapidity in order to prevent a difference in the speed of the saw and tubing from affecting the cut.

The rocking of the yoke 89 is controlled by a cam plate 101 located on a wall or other support 102. This cam plate has a cam groove 104 for guiding a cam follower 105 connected to the yoke 89. The cam follower 105 is preferably rotatable in order to reduce its friction against the walls of the cam groove 104. The peripheral face of the cam follower 105 is crowned so that the follower has substantially line contact with the walls of the cam groove 104 regardless of changes in the angularity of its axis of rotation when the yoke 89 rocks about its bearing on the frame 80.

Figure 5 shows the construction of the cam plate 101. The groove 104 extends for a length somewhat greater than the stroke of the carriage. Near the midportion of the groove 104 there is a wider section which includes an arch 108 at the top of the cam groove. Below the arch 108, a switch plate 110 is supported on a fulcrum bearing 111. This switch plate 110 is held in the position shown in Figure 5 by a spring 112.

As the cam follower 105 moves toward the right in Figure 5, it is deflected upwardly, by the switch plate 110, to follow the contour of the arch 108. After the cam follower 105 passes beyond the fulcrum support 111, it is displaced downwardly by the remaining portion of the arch 108 and pushes the switch plate 110 downwardly into the dotted line position, against the resistance of the spring 112.

When the cam follower 105 moves from the right-hand end of the track 104 and toward the left-hand end in Figure 5, the follower passes under the switch plate 110, lifting the portion of the switch plate 110 beyond the fulcrum support 111.

The prefered embodiment of the invention has been illustrated and described, but changes and modifications can be made, and some features of the invention can be used in different combinations without departing from the invention as defined in the claims.

I claim for my invention:

1. In tube-cutting apparatus adapted to cut a length of tube advancing with continuous motion, a flying cut-off device for cutting successive lengths from the continuous tube, a carriage for the cut-off device, guide means on opposite sides of the carriage and at opposite sides of a vertical line through the center of gravity of the carriage and extending substantially lengthwise parallel to the direction of movement of the tube as it comes to the cut-off device, restraining means between said carriage and said guide means restraining the movement of the carriage in the lengthwise direction of said guide means, and mechanism that reciprocates the carriage back and forth along said guide means including and endless belt located between the guide means and having straight runs throughout portions of its length parallel to the guide means, and wheels located below the plane of said guide means about which the belt runs to reverse its direction of travel, an element extending above the level of the guide means, and means on said carriage restraining said element against movement relative to said carriage in a direction lengthwise of said guide means but allowing transverse movement relative to said carriage to operably connect the belt with the reciprocating carriage to move the carriage positively and alternately in opposite directions along said guide means, and a variable speed transmission that drives the belt.

2. The combination described in claim 1 and in which said element is a stud connected to the endless belt, and the means on the carriage restraining said element includes bearings on the carriage on opposite sides of the stud and spaced from one another by a distance equal to the thickness of the stud, and extending parallel to one another transversely of the direction of travel of the carriage.

3. The combination described in claim 1, and in which the cut-off device includes a saw supported from the carriage and movable with respect to the carriage and transversely thereof into position to sever successive lengths from the continuous tube during movement of the carriage along the guide means in the direction of movement of the tube.

4. The combination described in claim 1, and in which the flying cut-off device includes a rotary cutter supported by the carriage and motor at a fixed location on a stationary base, motion-transmitting connections between the motor and the rotary cutter on the carriage, including two driving elements that have free sliding movement with respect to one another in a direction parallel to the direction of movement of the carriage to lengthen and shorten the length of said motion-transmitting connections to accommodate the movement of the carriage with respect to the stationary motor base.

References Cited in the file of this patent

UNITED STATES PATENTS

| | | |
|---|---|---|
| 1,124,762 | Lloyd | Jan. 12, 1915 |
| 1,418,437 | Grupe | June 6, 1922 |
| 1,986,833 | Littler | Jan. 8, 1935 |
| 2,022,574 | Schreck | Nov. 26, 1935 |
| 2,061,659 | Iverson | Nov. 24, 1936 |
| 2,063,689 | Littler | Dec. 8, 1936 |
| 2,079,974 | Traut | May 11, 1937 |
| 2,290,837 | Stuckert | July 21, 1942 |
| 2,326,978 | Sieg | Aug. 17, 1943 |
| 2,350,975 | Rodder et al. | June 6, 1944 |
| 2,370,932 | Bolling | Mar. 6, 1945 |
| 2,580,959 | Ropp | Jan. 1, 1952 |
| 2,632,232 | Wilson et al. | Mar. 24, 1953 |
| 2,645,001 | Rodder | July 19, 1953 |